(12) United States Patent
Wang et al.

(10) Patent No.: US 6,349,788 B1
(45) Date of Patent: Feb. 26, 2002

(54) POWER STEERING APPARATUS

(75) Inventors: Chaojiu Wang; Akihiko Serizawa, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/609,477

(22) Filed: Jul. 5, 2000

(30) Foreign Application Priority Data

Jul. 8, 1999 (JP) .............................. 11-194753

(51) Int. Cl.[7] .................................. F15B 9/10
(52) U.S. Cl. .................... 180/421; 137/625.23
(58) Field of Search ................ 180/421, 417, 180/441, 442; 137/625.23, 625.22; 91/375 A, 375 R

(56) References Cited

U.S. PATENT DOCUMENTS

| | | | | |
|---|---|---|---|---|
| 4,577,660 A | * | 3/1986 | Haga et al. ............ | 137/625.24 |
| 4,848,402 A | * | 7/1989 | Elser et al. ............ | 137/625.23 |
| 5,255,715 A | * | 10/1993 | Phillips ................ | 137/625.23 |
| 5,947,228 A | * | 9/1999 | Rolando ................ | 180/417 |
| 5,996,626 A | * | 12/1999 | Thomas ................ | 137/625.23 |

FOREIGN PATENT DOCUMENTS

| JP | 6239254 | 8/1994 | ........... B62D/5/083 |
|---|---|---|---|

* cited by examiner

Primary Examiner—Anne Marie Boehler
Assistant Examiner—Tony Winner
(74) Attorney, Agent, or Firm—Orum & Roth

(57) ABSTRACT

In a control valve of a power steering apparatus, mutually adjacent longitudinal grooves are formed at an inner surface of a sleeve, and each upper end of longitudinal grooves is arranged in a stagger layout, and each lower end thereof is arranged in a stagger layout.

9 Claims, 9 Drawing Sheets

F I G. 5A
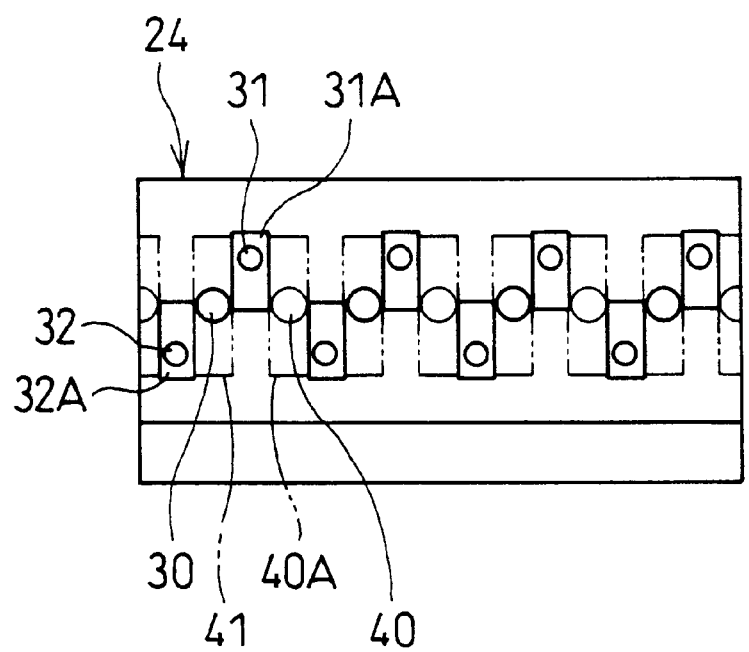
F I G. 5B
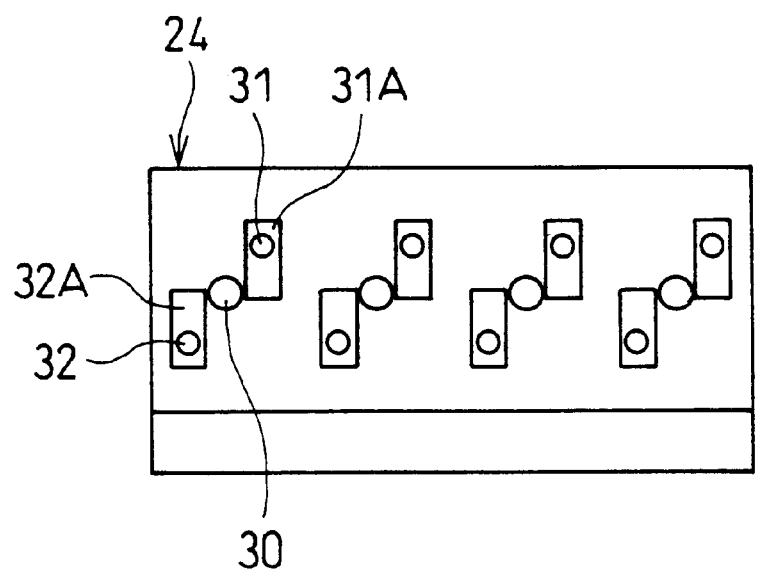

POWER STEERING APPARATUS

BACKGROUND OF THE INVENTION

1. Field of the Invention

The present invention relates to a power steering apparatus which includes a control valve for controlling the change-over of a working fluid passage with respect to a power cylinder.

2. Description of the Related Art

Conventionally, an engine speed sensitive type control valve 1 as shown in FIG. 10, or a vehicle speed sensitive type control valve 6 as shown in FIG. 11 have been used as a control valve of a power steering apparatus.

In the control valve 1 shown in FIG. 10, a rotary pool 1B is fitted into a sleeve 1A, and the rotary spool 1B and sleeve 1A are coaxially arranged so as to be relatively displaceable in accordance with a steering torque. The sleeve 1A is formed with a port group (four sets in FIG. 10). One set of the port group is composed of three ports, that is, a supply port 2 connected to a pump side supply passage, and a first port 3A and a second port 3B which are arranged on both sides of the supply port 2 and are connected individually to a first chamber and a second chamber of a power cylinder. The supply port 2 and first and second ports 3A and 3B are arranged around the central axis so as to be symmetrical with respect to the axial point. Moreover, the rotary spool 1B is formed with a plurality of return ports 4 (four in FIG. 10) which communicate with a tank side return passage and are arranged around the central axis so as to be symmetrical with respect to the axial point. The control valve 1 includes longitudinal grooves 5A to 5D. Longitudinal grooves 5A and 5B are formed at an inner surface of the sleeve 1A and at a position including the first port 3A and the second port 3B. A longitudinal groove 5C is formed at an outer surface of the rotary spool 1B and at a position relative to the supply port 2 of the sleeve 1A, and a longitudinal groove 5D is formed at the outer surface of the rotary spool 1B and at a position including the return port 4. These adjacent ports (supply port 2, first port 3A, second port 3B, return port 4) are capable of mutually communicated via these longitudinal grooves 5A to 5D.

In the control valve 1 shown in FIG. 10, in the case of neutral steering, a working fluid supplied to the supply port 2 flows from the longitudinal groove 5C to the return port 4 via the longitudinal grooves 5A, 5B and 5D. In the case of a steering wheel turn, the working fluid supplied to the supply port 2 flows from the longitudinal groove SC to the first port 3A (or the second port 3B) via the longitudinal groove 5A (or 5B) which is correlated with a steering wheel turn direction, and then, is supplied to the first chamber (or the second chamber) of the power cylinder so as to assist a steering force. At that time, a high pressure is applied to a portion of the longitudinal groove 5A (or 5B) of the sleeve 1A.

In the control valve 6 shown in FIG. 11, the sleeve 1A is formed with a second supply port 7 connected to a pump side supply passage, in addition to the construction of the control valve 1 shown in FIG. 10. The control valve 6 includes the following longitudinal grooves 8A and 8B. longitudinal grooves 8A and 8B are formed at an inner surface of the sleeve 1A and arranged on the both sides of the second supply port 7, and a longitudinal groove 9 is formed at an outer surface of the rotary spool 1B and at a position relative to the second supply port 7 of the sleeve 1A. The adjacent second supply port 7 and return port 4 of the rotary spool 1B are capable of mutually communicated via these longitudinal grooves 9, 8A, 8B and 5D.

In the control valve 6 shown in FIG. 11, a working fluid force fed by a pump is supplied to only supply port 2 during low vehicle speed, and is supplied to both supply port 2 and second supply port 7 during high vehicle speed. The assist force is greater during low vehicle speed, and is reduced during high vehicle speed.

The aforesaid prior art has the following problems.

① In the control valve 1 shown in FIG. 10, the sleeve 1A is formed with the longitudinal grooves 5A and 5B at its inner surface. Longitudinal grooves 5A and 5B are arranged in parallel with each other in a longitudinally wide range of the sleeve 1A with the same length. This makes rigidity of the sleeve 1A low (see FIG. 10B). In the sleeve 1A, an oil pressure applied to any longitudinal groves 5A and 5B becomes uniform in the case of neutral steering. The oil pressure elevates to a high pressure state in the case of a low vehicle speed. As a result, in the sleeve 1A, there is generated a diamond-shaped distortion such that a certain portion of these longitudinal grooves 5A and 5B are outwardly bulged (see FIG. 10C).

② In the control valve 1 shown in FIG. 11, the sleeve 1A is formed with the longitudinal grooves 5A and 5B at its inner surface, and further, includes the longitudinal grooves 8A and 8B. These longitudinal grooves 5A and 5B and 8A and 8B are arranged in parallel with each other in a longitudinally wide range of the sleeve 1A with the same length. This makes rigidity of the sleeve 1A low (see FIG. 11B). In the sleeve 1A, a working fluid is supplied to only supply port 2 in the case of a low vehicle speed, and is not supplied to the second supply port 7. For this reason, pressure distribution acting to a circumferential direction of the sleeve 1A becomes unbalanced and distortion is generated in the sleeve 1A (see FIG. 11C).

③ In the prior art, the aforesaid distortion of the sleeve 1A stated in the above items ① and ② gives an influence to a relative rotation (ie., valve characteristic) of the sleeve 1A and the rotary spool 1B. In order to avoid the aforesaid influence, the clearance formed between the sleeve 1A and the rotary spool 1B is made large. However, this is a factor which increases oil leakage and lowers pump efficiency.

SUMMARY OF THE INVENTION

It is, therefore, an object of the preset invention to improve rigidity of a sleeve constituting a control valve, and to minimize a clearance formed between the sleeve and a rotary spool so as to reduce oil leakage while preferably securing operation of the sleeve and the rotary spool, and thus, to improve the valve characteristic.

According to the present invention, there is disposed a power steering apparatus including a control valve for controlling a change-over of a pump side supply passage and a tank side return passage with respect to a first chamber and a second chamber of a power cylinder of a steering arrangement, The control valve comprises a sleeve and a rotary spool fitted into the sleeve.

The sleeve and the rotary spool are coaxially arranged so as to be relatively displaceable in accordance with a steering torque.

The sleeve has a supply port connected to the pump side supply passage, and first and second ports which are connected individually to the first and second ambers of the power cylinder and are arranged around a central axis so as to be symmetrical with respect to an axial point.

The rotary spool has a return port which is connected to the tank side return passage and is arranged around a central axis so as to be symmetrical with respect to an axial point.

Upon assembling the sleeve and the rotary spool, each longitudinal groove extending in a valve axial direction is formed at an inner surface of the sleeve so that adjacent ports of the sleeve and the rotary spool communicate with each other. Each upper end of the adjacent longitudinal grooves is arranged in a stagger layout.

Furthermore, according to the present invention, there is disclosed a power steering apparatus including a control valve for controlling a change-over of a pump side supply passage and a tank side return passage with respect to a first chamber and a second chamber of a power cylinder of a steering arrangement.

The control valve comprises a sleeve and a rotary spool fitted into the sleeve.

The sleeve and the rotary spool are coaxially arranged so as to be relatively displaceable in accordance with a steering torque.

The sleeve has a supply port connected to the pump side supply passage, and first and second ports which are connected individually to the first and second chambers of the power cylinder and are arranged around a central axis so as to be symmetric with respect to an axial point.

The rotary spool has a return port which is connected to the tank side return passage and is arranged around a central axis so as to be symmetrical with respect to an axial point.

Upon assembling the sleeve and the rotary spool, each longitudinal groove extending in a valve axle direction is formed at an inner surface of the sleeve so that adjacent ports of the sleeve and the rotary spool communicate with each other. Each lower end of the adjacent longitudinal grooves is arranged in a stagger layout.

Furthermore, according to the present invention, there is disclosed a power steering apparatus including a control valve for controlling a change-over of a pump side supply passage and a tank side return passage with respect to a first chamber and a second chamber of a power cylinder of a steering arrangement, The control valve comprises a sleeve and a rotary spool fitted into the sleeve.

The sleeve and the rotary spool are coaxially arranged so as to be relatively displaceable in accordance with a steering torque.

The sleeve has a supply port connected to the pump side supply passage, and first and second ports which are connected individually to the first and second chambers of the power cylinder and are arranged around a central axis so as to be symmetrical with respect to an axial point.

The rotary spool has a return port which is connected to the tank side return passage and is arranged around a central axis so as to be symmetrical with respect to an axial point, Upon assembling the sleeve and the rotary spool, each longitudinal groove extending in a valve axial direction is formed at an inner surface of the sleeve so that adjacent ports of the sleeve and the rotary spool communicate with each other. Each upper end of the adjacent longitudinal grooves is arranged in a stagger layout, and each lower end thereof is arranged in a stagger layout.

BRIEF DESCRIPTION OF THE DRAWINGS

The present invention will be more filly understood from the detailed description given below and from the accompanying drawings which should not be taken to be a imitation on the invention, but are for explanation and understanding only.

The drawings

FIG. 5 is a schematic view of the control valve;

DESCRIPTION OF THE PREFERRED EMBODIMENTS

First Embodiment FIG. 1 to FIG. 5

Figure 1:
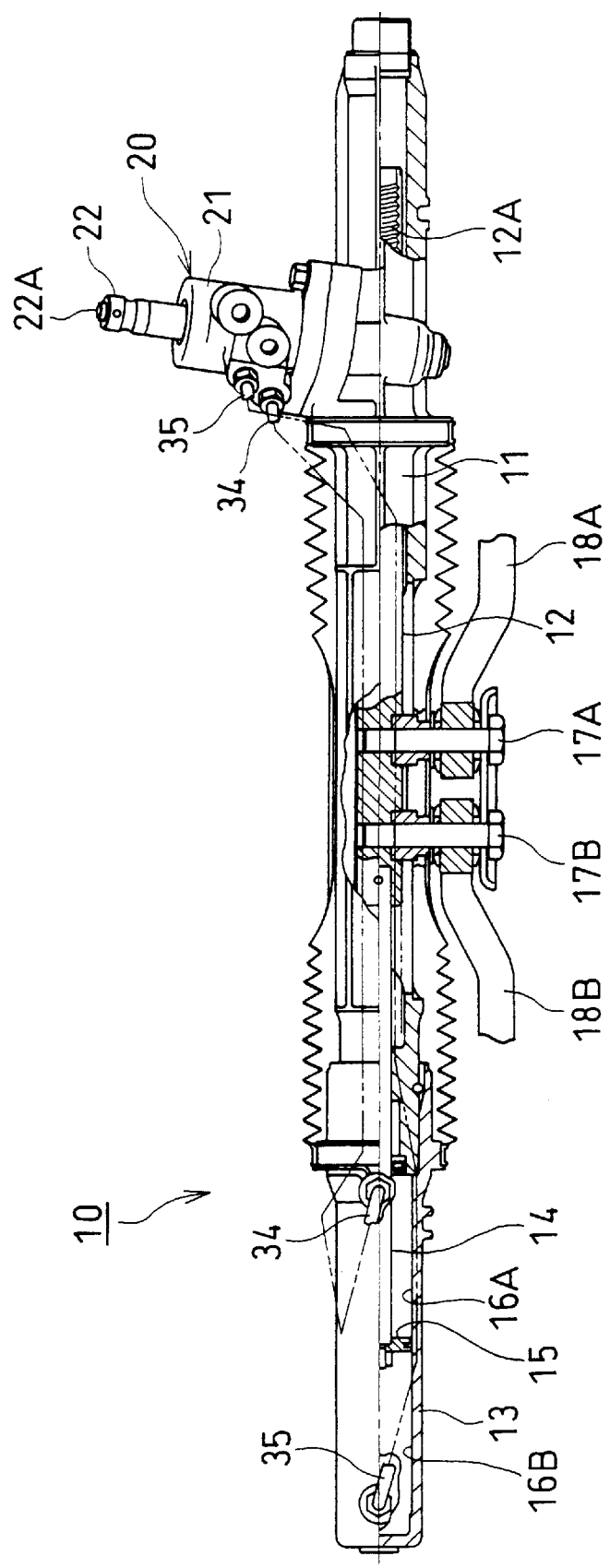
FIG. 1 is a schematic view showing a hydraulic power steering apparatus.

As shown in FIG. 1, a hydraulic power steering apparatus 10 is constructed in a manner that a rack shaft 12 is supported to a steering body 11 fixed to a vehicle frame, etc., by a bracket (not shown) so as to be linearly movable, and includes a power cylinder 13 at one end side. A piston rod 14 of the power cylinder 13 is connected to the rack shaft 12. The power cylinder 13 is a single rod type, and a piston 15 is provided at an insertion end of the piston rod 14. Further, in the power steering apparatus 10, right and left tie rods 18A and 18B are connected to the rack shaft 12 by bolts 17A and 17B so as to assist steering force of a steering wheel operated by a driver.

Figure 2:
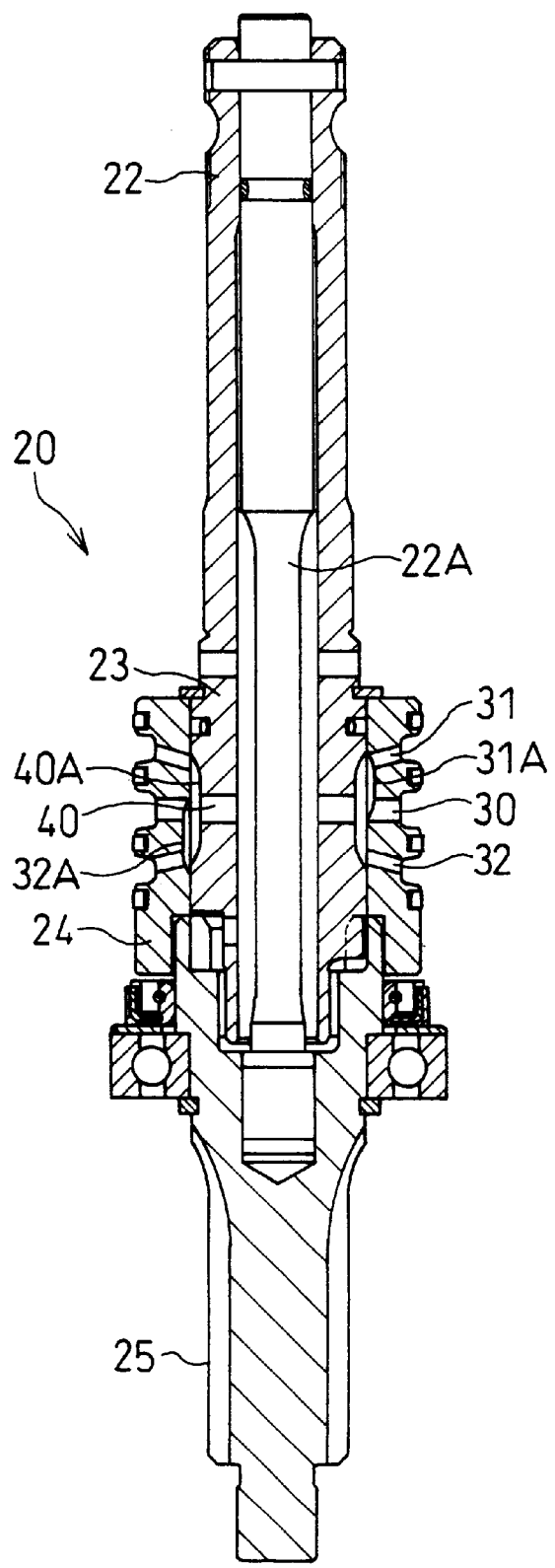
FIG. 2 is a schematic view showing an engine speed sensitive type control valve according to a first embodiment.

Moreover, the power steering apparatus 10 is constructed in a manner that a valve body 21 of an engine speed sensitive type control valve 20 is fixed to the steering body 11. As shown in FIG. 2, in a control valve 20, an input shaft 22 rotating synchronous with a steering wheel is rotatably supported to the valve body 21, and a cylindrical rotary spool 23 is fixed to the input shaft 22, and a cylindrical sleeve 24 is fixed to a distal end of a torsion bar 22A fixed to the input shaft 22 together with a pinion 25. The cylindrical rotary spool 23 and the cylindrical sleeve 24 are coaxially arranged so as to be relatively displaceable by an elastic twist deformation of the torsion bar 22A in response to a steering torque applied to the steering wheel. A pump side supply passage 101A and a tank side return passage 102A are controlled so as to be changed over to a first chamber 16A and a second chamber 16B of the power cylinder 13. In this case, the pinion 25 fixed to the sleeve 24 is engaged with a rack tooth 12A of the rack shaft 12.

Figure 3:
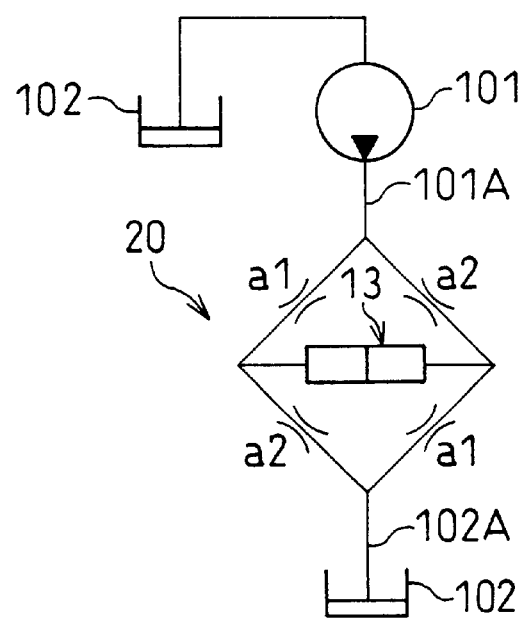
FIG. 3 is a diagram showing an equivalent circuit of a control valve.

FIG. 3 is a view showing an equivalent circuit of the control valve 20, and in FIG. 3, a reference numeral 101 denotes a pump driven by an engine, and 102 denotes a tank.

Figure 4:
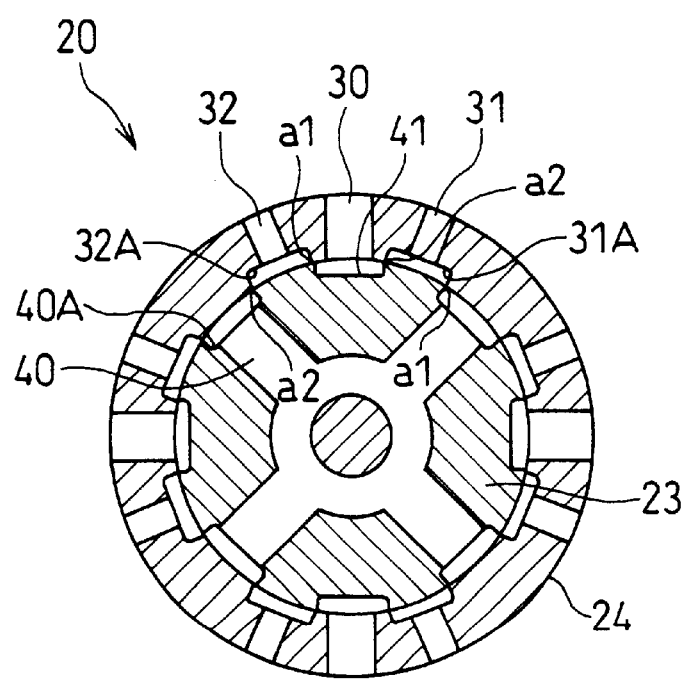
FIG. 4 is a cross sectional view of the control valve.

The following is a detailed description on a construction of the sleeve 24 and the rotary spool 23 of the control valve 20 (see FIG. 4 and FIG. 5).

More specifically, the sleeve 24 is formed with a port group (four sets). One set of the port group is composed of a supply port 30 connected to the pump side supply passage 101A, and a first port 31 and a second port 32 which are arranged on both sides of the supply port 30 so as to be connected individually to the first chamber 16A and the second chamber 16B of the power cylinder 13. Further, these ports are arranged around the central axis (torsion bar 22A)

so as to be symmetrical respect to the axial point. In this case, the first port 31 is connected to the first chamber 16A via a first communicating passage 34. The second port 32 is connected to the second chamber 16B via a second communicating passage 35.

Moreover, the rotary spool 23 is formed with a plurality of (four) return ports 40 which communicate with the tank side return passage 102A and are arranged around the central axis (torsion bar 22A) so as to be symmetric with respect to the axial point.

The control valve 20 includes longitudinal grooves 31A and 32A formed at an inner surface of the sleeve 24 and at a position including the first port 31 and the second port 32. A longitudinal groove 41 is formed at an outer surface of the rotary spool 23 and at a position relative to the supply port 30 of the sleeve 24. A longitudinal groove 40A is formed at the outer surface of the rotary spool 23 and at a position including the return port 40. These adjacent ports (supply port 30, first port 31, second port 32, return port 40) are capable of mutually communicated via these longitudinal grooves 31A, 32A, 41 and 40A.

Further, in the control valve 20, throttle portions a1 and a2 as shown in FIG. 4 are formed by both side edge portions of the longitudinal groove 31A (or 32A) of the sleeve 24 and side edge portions of the longitudinal grooves 41 and 40A of the rotary spool 23 capable of communicating with the longitudinal groove 31A.

The control valve 20 is operated in the following manner.

(1) In the case of neutral steering, the rotary spool 23 and the sleeve 24 are kept at a relative position as shown in FIG. 4, and the supply port 30 of the sleeve 24 faces the longitudinal groove 41 of the rotary spool 23. A working fluid supplied to the supply port 30 flows from the longitudinal groove 41 to the return port 40 via the longitudinal grooves 31A, 32A and 40A under these conditions, the power cylinder 13 is not operated (2) In the case of a steering wheel turn, when the rotary spool 23 makes a light-handed rotation from the state shown in FIG. 4, the throttle portion a1 is dosed, and an opening of the throttle portion a2 becomes large. Therefore, the working fluid supplied to the supply port 30 passes through the first port 31 from the throttle portion a2, and then, is supplied to the first chamber 16A of the power cylinder 13 so as to assist steering force. Working fluid supplied to the second chamber 16B is returned from the second port 32 to the return port 40 via the throttle portion a2.

Thus, in the control valve 20, a discharge of working fluid of the pump 101 controlled in accordance with rotational speed of an engine is supplied to the power cylinder 13 via an opening of a throttle valve of the control valve 20, and thereby, it is possible to adjust an assist force with respect to a steering force.

Moreover, in the control valve 20, as shown in FIG. 2 and FIG. 5, the supply port 30 is formed at an intermediate portion between upper and lower end sides of the sleeve 24. The first port 31 is formed at the upper end side thereof, and the second port 32 is formed at the lower end side thereof. In this first embodiment, the longitudinal groove 31A including the first port 31 is formed so as to have a short length extending from the intermediate portion to the upper end side. The longitudinal groove 32A including the second port 32 is formed so as to have a short length extending from the intermediate portion to the lower end side. The longitudinal grooves 31A and 32A mutually adjacent to each other are arranged in a stagger layout so that the longitudinal groove 31A is positioned at an upper end side, and are arranged in a stagger layout so that the longitudinal groove 32A is positioned at a lower end side.

This first embodiment has the following effect.

Longitudinal grooves 31A and 32A formed at an inner surface of the sleeve 24 are arranged in a stagger layout so that the longitudinal groove 31A is positioned at an upper end side, and are arranged in a stagger layout so that the longitudinal groove 32A is positioned at a lower end side. Thereby, rigidity of the sleeve 24 is improved, and also, an area of the sleeve 24 receiving pressure is reduced. Accordingly, it is possible to prevent distortion of the sleeve 24 from being generated by a working fluid acting on the inner surface of the sleeve 24. Moreover, clearance formed between the sleeve 24 and the rotary spool 23 is minimized, and thereby, it is possible to reduce oil leakage, and to preferably secure operation of the sleeve 24 and the rotary spool 23, and thus, to improve the valve characteristic.

Second Embodiment FIG. 6 to FIG. 10

Figure 7:
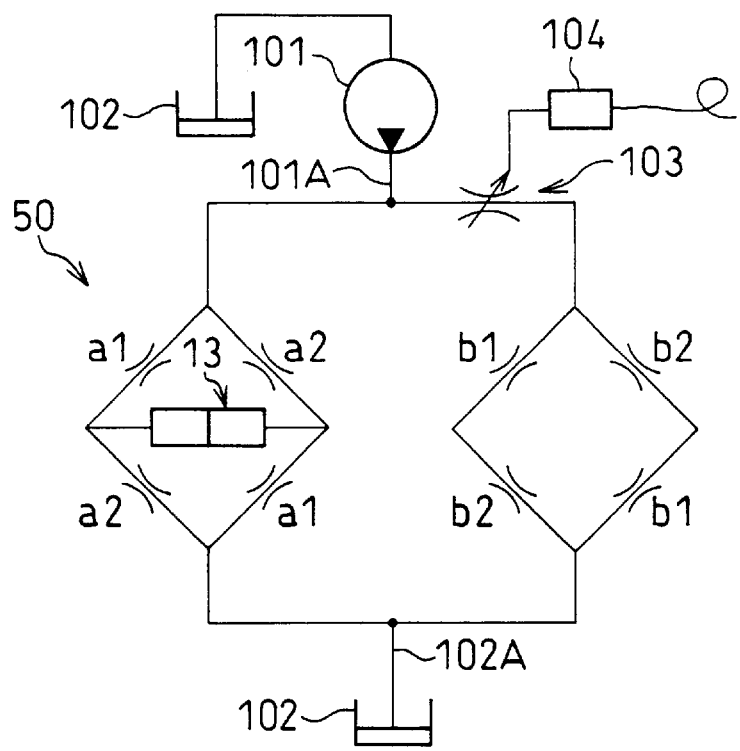
FIG. 7 is a diagram showing an equivalent circuit of a control valve.

This second embodiment is different from the first embodiment in that a vehicle speed sensitive type control valve 50 is employed FIG. 7 is a diagram showing an equivalent circuit of the control valve 50.

Figure 8:
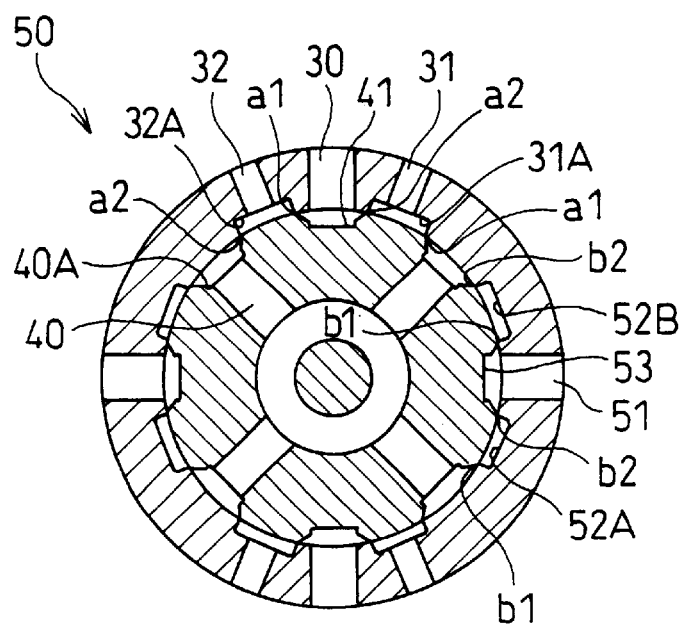
FIG. 8 is a cross sectional view of the control valve.

A sleeve 24 and a rotary spool 23 of the control valve 50 partially have the same structure as the aforesaid control valve 20. The sleeve 24 has a first supply port 30, a first port 31, a second port 32, and longitudinal grooves 31A and 32A The rotary spool 23 has a return port 40, and longitudinal grooves 41 and 40A The control valve 50 is different from the aforesaid control valve 20 in that the sleeve 24 includes a second supply port 51 connected to the pump side supply passage 101A, longitudinal grooves 52A and 52B which are arranged on both sides of the second supply port 51 at an inner surface of the sleeve 24, and a longitudinal groove 53 which is formed at an outer surface of the rotary spool 23 and is arranged at a position relative to the second supply port 51 of the sleeve 24. Further, mutually adjacent second supply port 51 and return port 40 of the rotary spool 23 are capable of communicating with each other via their longitudinal grooves 53, longitudinal grooves 52A and 52B and longitudinal groove 40A Further, the control valve 50 has the same throttle valves a1 and a2 as the control valve 20, and in addition, in the control valve 50, throttle portions b1 and b2 as shown in FIG. 8 are formed by both side edge portions of the longitudinal groove 52A (or 52B) of the sleeve 24 and side edge portions of the longitudinal grooves 53 and 40A of the rotary spool 23 capable of communicating with the longitudinal groove 52A.

In the control valve 50, the pump side supply passage 101A connected to the second supply port 51 is provided with a variable throttle valve 103. An opening of the variable throttle valve 103 is controlled by a vehicle speed sensor 104. The variable throttle valve 103 is fully dosed in the case of low vehicle speed, and the opening of the throttle valve 103 is increased as vehicle speed gradually becomes high.

The control valve 50 is operated in the following manner.

(1) In the case of low vehicle speed, the variable throttle valve 103 is fully dosed, and therefore, essentially all of the working fluid supplied from the pump 101 is supplied to the supply port 30.

(1-1) At that time, in the case of a neutral steering state, the rotary spool 23 and the sleeve 24 are kept at a relative position as shown in FIG. 8. The working fluid supplied to the first supply port 30 flows from the longitudinal groove 41 to the return port 40 via the longitudinal grooves 31A, 32A and 40A In this state, the power cylinder 13 is not operated.

(1-2) In the case of a steering wheel turn, when the rotary spool 23 makes a right-handed rotation from the state shown in FIG. 8, the throttle portion a1 is dosed, and an opening of the throttle portion a2 becomes large. Therefore, the working fluid supplied to the first supply port 30 passes through the first port 31 from the throttle portion a2, and then, is supplied to the first chamber 16A of the power cylinder 13 so as to assist steering force. Working fluid supplied to the second chamber 16B is returned from the second port 32 to the return port 40 via the throttle portion a2. In the steering wheel turning state in the case of low vehicle speed, the whole discharge amount of the pump 101 is supplied to the power cylinder 13. The assist force then becomes maximum.

(2) In the case of a high vehicle speed, an opening of the variable throttle valve 103 becomes large, and a flow rate passing through the variable throttle valve 103 becomes greater.

(2-1) At that time, when a driver slowly rotates the steering wheel to a right-hand direction from the state shown in FIG. 8 (slow steering wheel turn), the throttle portion b1 (chamfered state larger than the throttle valve a1) is not still dosed, and the working fluid supplied from the pump side supply passage 101A to the second supply port 51 flows to the return port 40 via the longitudinal grooves 53, 52A, 52B and 40A Thus, a supply amount from pump 101 to the first supply port 30 is relatively reduced so as to reduce assist force by the power cylinder 13.

(2-2) On the other hand, when a driver rapidly rotates a steering wheel to a right-hand direction from the state shown in FIG. 8 (rapid steering wheel turn), the throttle portion b1 is dosed, and the working fluid supplied from the pump side supply passage 10A to the second supply port 51 is blocked off by the throttle valve b1. Essentially the entire discharge amount of the pump 101 is supplied to the first supply port 30, like the case of a low vehicle speed, and an assist force by the power cylinder 13 is made large so as to get rid of an unfavorable assist feeling in the steering operation.

Figure 6:
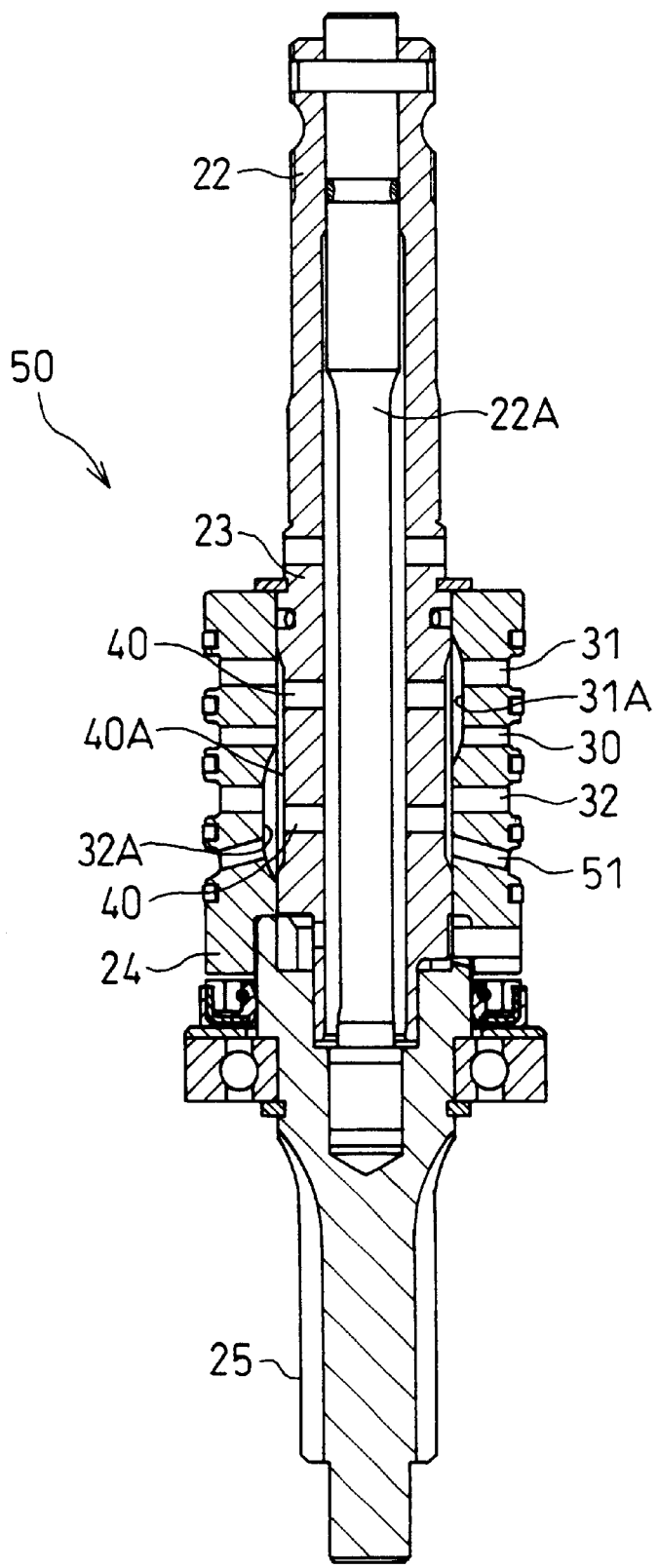
FIG. 6 is a schematic view showing a vehicle speed sensitive type control valve according to a second embodiment.
Figure 9A:
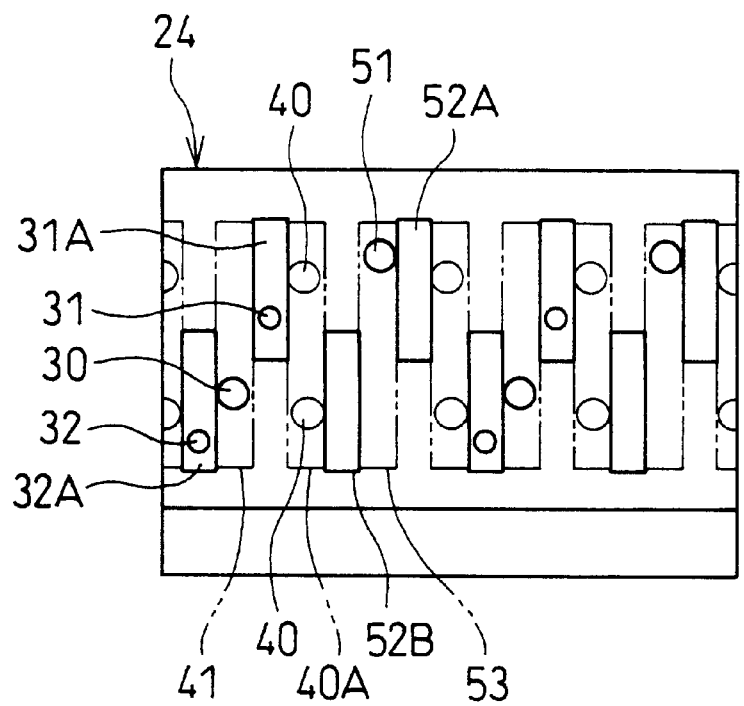
FIG. 9 is a schematic view of the control valve.
Figure 9B:
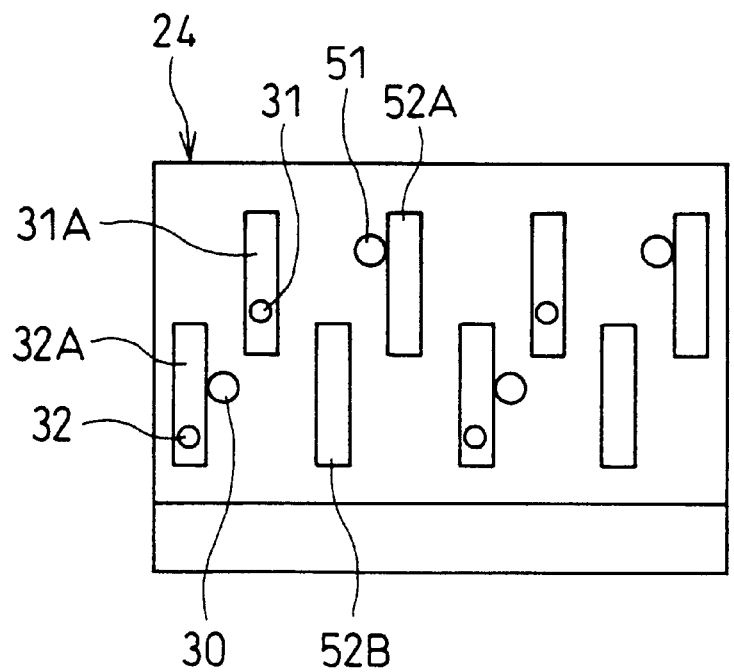
Figure 10A:
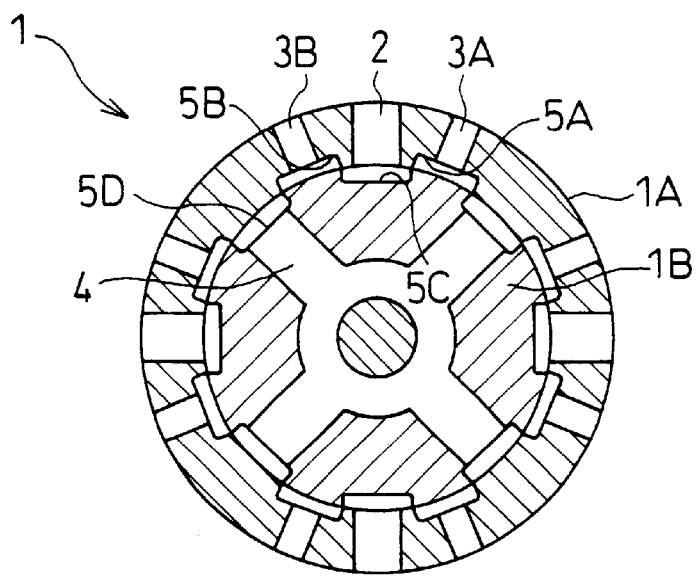
FIG. 10 is a schematic view showing a conventional engine speed sensitive type control valve.
Figure 10B:
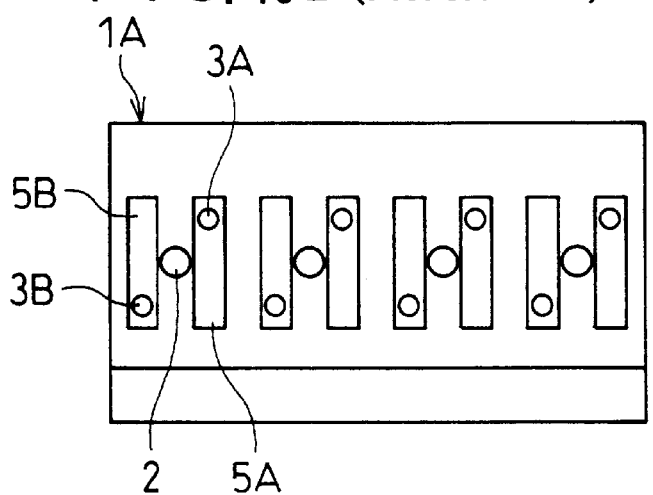
Figure 10C:
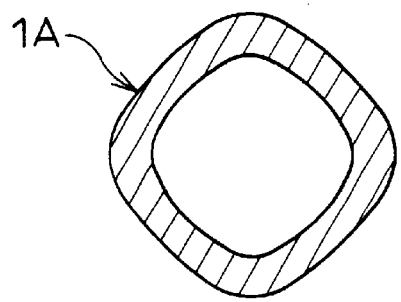
Figure 11A:
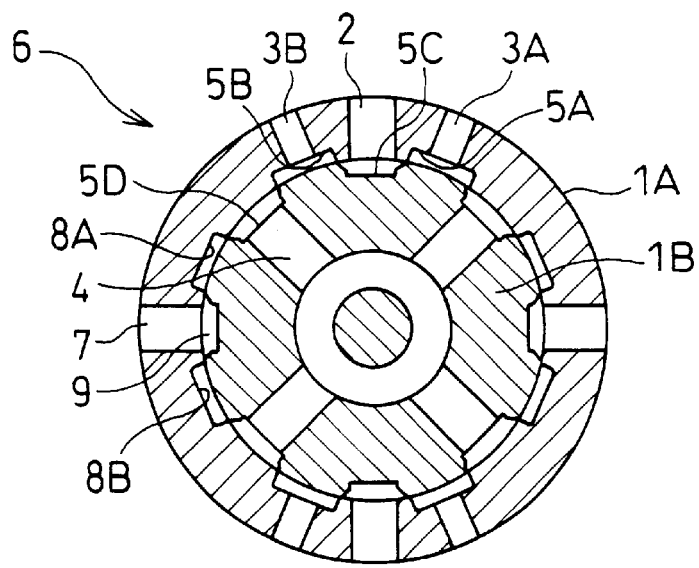
FIG. 11 is a schematic view showing a conventional vehicle speed sensitive type control valve.
Figure 11B:
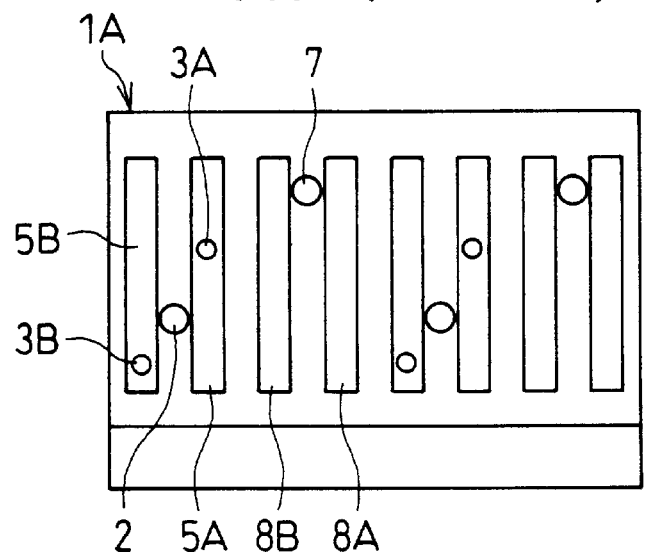
Figure 11C:
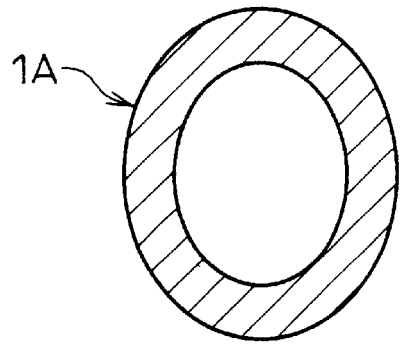

Moreover, in the control valve 50, as shown in FIG. 6 and FIG. 9, the first supply port 30 is formed at an intermediate portion between upper and lower end sides of the sleeve 24, and the first port 31 is formed at the upper end side thereof. The second port 32 and the second supply port 51 are formed at the lower end side thereof In this second embodiment, the longitudinal grooves 31A including the first port 31 and the longitudinal groove 52A are formed so as to have a short length extending from the intermediate portion to the upper end side. The longitudinal grooves 32A including the second port 32 and the longitudinal groove 52B are formed so as to have a short length extending from the intermediate portion to the lower end side. The longitudinal grooves 31A, 32A, 52A and 52B mutually adjacent to each other are arranged in a stagger layout so that the longitudinal grooves 31A and 52A are positioned at an upper end side, and are arranged in a stagger layout so that the longitudinal grooves 32A and 52B are positioned at a lower end side.

This second embodiment has the following effect.

The longitudinal grooves 31A, 32A, 52A and 52B formed at an inner surface of the sleeve 24 are arranged in a stagger layout so that the longitudinal grooves 31A and 52A are positioned at an upper end side, and are arranged in a stagger layout so that the longitudinal grooves 32A and 52B are positioned at a lower end side. Thereby, rigidity of the sleeve 24 is improved, and also, an area of the sleeve 24 receiving pressure is reduced Accordingly, it is possible to prevent distortion of the sleeve 24 from being generated by a working fluid acting on the inner surface of the sleeve 24. Moreover, a clearance formed between the sleeve 24 and the rotary spool 23 is minimized, and thereby, it is possible to reduce oil leakage, and to preferably secure operation of the sleeve 24 and the rotary spool 23, to improve the valve characteristic.

As heretofore explained, embodiments of the present invention have been described in detail with reference to the drawings. However, the specific configurations of the present invention are not limited to the embodiments but those having a modification of the design within the range of the present invention are also included in the present invention. For instance, in another embodiment, only each upper end of adjacent longitudinal grooves formed at the inner surface of the sleeve may be arranged in a stagger layout, while each lower end is arranged at the identical level, or only each lower end thereof may be arranged in a stagger layout, while each upper end is arranged at the identical level.

Therefore, as is evident from the above description, according to the present invention, it is possible to improve rigidity of a sleeve constituting the control valve. Moreover, clearance formed between the sleeve and the rotary spool is minimized, and thereby, it is possible to reduce oil leakage, and to preferably secure operation of the sleeve and the rotary spool, and thus, to improve the valve characteristic.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A power steering apparatus including
a control valve for controlling a change-over of a pump side supply passage and a tank side return passage with respect to a first chamber and a second chamber of a power cylinder in accordance with a steering operation,
the control valve comprising:
a sleeve; and
a rotary spool fitted into the sleeve,
the sleeve and the rotary spool being coaxially arranged so as to be relatively displaceable in accordance with a steering torque,
the sleeve having a supply port connected to the pump side supply passage, and first and second ports which are connected individually to the first and second chambers of the power cylinder and are arranged around a central axis so as to be symmetrical with respect to an axial point,
the rotary spool having a return port which is connected to the tank side return passage and is arranged around a central axis so as to be symmetric with respect to an axial point, wherein
in a state of assembling the sleeve and the rotary spool, each longitudinal groove extends in a valve axial direction being formed at an inner surface of the sleeve so that adjacent ports of the sleeve and the rotary spool communicate with each other, with each upper end of the adjacent longitudinal grooves being arranged in a stagger layout.

2. A power steering apparatus including
a control valve for controlling a change-over of a pump side supply passage and a tank side return passage with respect to a first chamber and a second chamber of a power cylinder in accordance with a steering operation, the control valve comprising:
sleeve; and
a rotary spool fitted into the sleeve,
the sleeve and the rotary spool being coaxially arranged so as to be relatively displaceable in accordance with a steering torque,
the sleeve having a supply port connected to the pump side supply passage, and first and second ports which are connected individually to the first and second chambers of the power cylinder and are arranged around a central axis so as to be symmetrical with respect to an axial point,
the rotary spool having a return port which is connected to the tank a side return passage and is arranged around a central axis so as to be symmetrical with respect to an axial point, wherein
in a state of assembling the sleeve and the rotary spool, each longitudinal groove extends in a valve axial direction being formed at an inner surface of the sleeve so that adjacent ports of the sleeve and the rotary spool communicate with each other, with each lower end of the adjacent longitudinal grooves being arranged in a stagger layout.

3. A power steering apparatus including
a control valve for controlling a change-over of a pump side supply passage and a tank side return passage with respect to a first chamber and a second chamber of a power cylinder in accordance with a steering operation, the control valve comprising:
a sleeve; and
a rotary spool fitted into the sleeve,
the sleeve and the rotary spool being coaxially arranged so as to be relatively displaceable in accordance with a steering torque,
the sleeve having a supply port connected to the pump side supply passage, and first and second ports which are connected individually to the first and second chambers of the power cylinder and are arranged around a central axis so as to be symmetrical with respect to an axial point,
the rotary spool having a return port which is connected to the tank side return passage and is arranged around a central axis so as to be symmetrical with respect to an axis & point, wherein
in a state of assembling the sleeve and the rotary spool, each longitudinal groove extends in a valve axial direction being formed at an inner surface of the sleeve so that adjacent ports of the sleeve and the rotary spool communicate with each other, and each upper end of the adjacent longitudinal grooves is arranged in a stagger layout, each lower end thereof being arranged in a stagger layout.

4. The power steering apparatus according to claim 1, wherein the control valve has a supply port connected directly to the pump side supply passage as the supply port, and is constructed as an engine speed sensitive type control valve, and
in the case of neutral steering, working fluid supplied to the supply port flows to the return port via the longitudinal groove, and in the case of steering wheel turn, working fluid supplied to the supply port flows from the first port or the second port to the power cylinder.

5. The power steering apparatus according to claim 2, wherein the control valve has a supply port connected directly to the pump side supply passage as the supply port, and is constructed as an engine speed sensitive type control valve, and
in the case of neutral steering, working fluid supplied to the supply port flows to the return port via the longitudinal groove, and in the case of steering wheel turn, working fluid supplied to the supply port flows from the first port or the second port to the power cylinder.

6. The power steering apparatus according to claim 3, wherein the control valve has a supply port connected directly to the pump side supply passage as the supply port, and is constructed as an engine speed sensitive type control valve, and
in the case of neutral steering, working fluid supplied to the supply port flows to the return port via the longitudinal groove, and in the case of steering wheel turn, working fluid supplied to the supply port flows from the first port or the second port to the power cylinder.

7. The power steering apparatus according to claim 1, wherein the control valve has a first supply port connected directly to the pump side supply passage as the supply port, and a second supply port connected directly to the pump side supply passage via a variable throttle valve controlled by a vehicle speed sensor, and is constructed as a vehicle speed sensitive type control valve, and
in a low vehicle speed state, the variable throttle valve is filly dosed, and in the case of neutral steering, working fluid supplied to the first supply port flows to the return port via the longitudinal groove, and in the case of steering wheel turn, working fluid supplied to the first supply port flows from the first port or the second port to the power cylinder,
in a high vehicle speed state, the variable throttle valve is opened, and in the case of slow sting wheel turn, working fluid supplied to the second supply port flows to the return port via the longitudinal groove, and a supply amount from a pump to the first supply port is reduced so as to reduce assist force by the power cylinder, and in the case of rapid steering wheel turn, working fluid supplied to the second supply port is blocked off so that the whole discharge of the pump is supplied to the first supply port.

8. The power steering apparatus according to claim 2, wherein the control valve has a first supply port connected directly to the pump side supply passage as the supply port, and a second supply port connected directly to the pump side supply passage via a variable throttle valve controlled by a vehicle speed sensor, and is constructed as a vehicle speed sensitive type control valve, and
in a low vehicle speed state, the variable throttle valve is fully dosed, and in the case of neutral steering, working fluid supplied to the first supply port flows to the return port via the longitudinal groove, and in the case of steering wheel turn, working fluid supplied to the first supply port flows from the first port or the second port to the power cylinder,
in a high vehicle speed state, the vehicle throttle valve is opened, and in the case of slow steering wheel turn, working fluid supplied to the second supply port flows to the return port via the longitudinal groove, and a supply amount from a pump to the first supply port is reduced so as to reduce assist force by the power cylinder, and in the case of rapid steering wheel turn, the working fluid supplied to the second supply port is blocked off so that essentially the entire discharge of the pump is supplied to the first supply port.

9. The power steering apparatus according to claim 3, wherein the control valve has a first supply port connected directly to the pump side supply passage as the supply port, and a second supply port connected directly to the pump side supply passage via a variable throttle valve controlled by a vehicle speed sensor, and is constructed as a vehicle speed sensitive type control valve, and in a low vehicle speed state, the variable throttle valve is fully dosed, and in the case of neutral steering, working fluid supplied to the first supply port flows to the return port via the longitudinal groove, and in the case of steering wheel turn, working fluid supplied to the first supply port flows from the first port or the second port to the power cylinder, in a high vehicle speed state, the variable throttle valve is opened, and in the case of slow steering wheel turn, working fluid supplied to the second supply port flows to the return port via the longitudinal groove, and a supply amount from a pump to the first supply port is reduced so as to reduce assist force by the power cylinder, and in the case of rapid steering wheel turn, working fluid supplied to the second supply port is blocked off so that essentially the entire discharge of the pump is supplied to the first supply port.

* * * * *